United States Patent
Appia et al.

(10) Patent No.: US 12,299,971 B2
(45) Date of Patent: *May 13, 2025

(54) FIELD DETERMINATION FOR OBSTACLE DETECTION

(71) Applicant: Rivian IP Holdings, LLC, Irvine, CA (US)

(72) Inventors: Vikram Appia, San Jose, CA (US); Umit Batur, Seattle, WA (US); Qian Song, Menlo Park, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/203,791

(22) Filed: May 31, 2023

(65) Prior Publication Data

US 2023/0306733 A1    Sep. 28, 2023

Related U.S. Application Data

(63) Continuation of application No. 16/930,489, filed on Jul. 16, 2020, now Pat. No. 11,704,902.

(51) Int. Cl.
*G06V 20/00* (2022.01)
*G08G 1/16* (2006.01)

(52) U.S. Cl.
CPC .............. *G06V 20/00* (2022.01); *G08G 1/166* (2013.01)

(58) Field of Classification Search
CPC ....... G06V 20/00; G08G 1/166; B60W 60/00; B60W 60/0015; B60W 40/06; B60W 40/04; B60W 30/09; B60W 10/18; B60W 10/20; B60W 2420/42; B60W 2552/53
See application file for complete search history.

(56) References Cited

U.S. PATENT DOCUMENTS

| | | | |
|---|---|---|---|
| 8,487,991 B2 | 7/2013 | Zhang | |
| 11,537,811 B2 | 12/2022 | Shen | |
| 11,704,902 B2* | 7/2023 | Appia | G06V 20/00 701/36 |

(Continued)

FOREIGN PATENT DOCUMENTS

| | | |
|---|---|---|
| CN | 109214348 A | 1/2019 |
| CN | 109941286 A | 6/2019 |

OTHER PUBLICATIONS

List of references in corresponding U.S. Appl. No. 16/930,489.

(Continued)

*Primary Examiner* — Jason Holloway
(74) *Attorney, Agent, or Firm* — BAKERHOSTETLER

(57) ABSTRACT

Apparatuses, systems, and methods for determining a field in a path of travel of a vehicle for detection of objects in the path of travel. An apparatus includes a path identifier configured to identify a path of travel for a vehicle. At least one camera is disposed on the vehicle and is configured to capture image data of an area including the path of travel. A region of interest selector is configured to select a region of interest within the image data. A horizon identifier is configured to identify a horizon in the image data. A field determiner is configured to project the horizon onto the region of interest to isolate a field specified by the path of travel and the horizon, the field being evaluatable for the presence of objects in the path of travel of the vehicle.

20 Claims, 14 Drawing Sheets

(56) References Cited

U.S. PATENT DOCUMENTS

2004/0016870 A1    1/2004   Pawlicki
2010/0097455 A1    4/2010   Zhang
2013/0321629 A1   12/2013   Zhang
2016/0267331 A1    9/2016   Pillai
2019/0226866 A1    7/2019   Chang

OTHER PUBLICATIONS

Chinese Office Action from Chinese Patent Application No. 202110743548.5, dated Jan. 23, 2025, 20 pages with machine-generated English language translation.

* cited by examiner

FIELD DETERMINATION FOR OBSTACLE DETECTION

CROSS-REFERENCE TO RELATED APPLICATION

The present disclosure is a continuation of U.S. patent application Ser. No. 16/930,489, filed on Jul. 16, 2020, and entitled "FIELD DETERMINATION FOR OBSTACLE DETECTION," which issued as U.S. Pat. No. 11,704,902, the contents of which are incorporated in full by reference herein.

INTRODUCTION

The present disclosure relates to determining a field in a path of travel for a vehicle for detection of objects in the path of travel.

The statements in this section merely provide background information related to the present disclosure and may not constitute prior art.

The development of technology in the automotive industry allows for the possibility of driverless vehicles or driver-operated vehicles with collision-warning or collision-avoidance capabilities. For successful operation of such systems, the vehicle control systems must be able to detect obstacles in the path of the vehicle while operating at normal travel speeds. A car moving at a highway speed of 70 miles per hour travels more than 100 feet each second. Thus, the control system of the vehicle must be able to very quickly identify objects in the path of travel to be able to warn a driver of objects present in the path of travel or to automatically avoid such objects.

In using optical sensors to identify objects in the path of travel, for an autonomous vehicle or a vehicle with driver assistance features, an area is to be identified for evaluation for the presence of objects to be avoided. Scanning the area ahead of the vehicle to visual infinity in all but the emptiest environments will identify objects that lie ahead of the vehicle. However, at least some of those objects may be topographical features, foliage, buildings, or other objects in the distance that are not in the path of travel of the vehicle or in the roadway at all. It may be desirable to identify objects that actually are in the path of travel so that the control system of the vehicle can steer or brake to avoid the object (or warn the operator to do the same). On the other hand, an object that appears to be before the vehicle but actually is outside the path of travel, such as an object beyond or outside of the roadway, is not a concern for the control system of the vehicle.

A human operator may take advantage of human intuition to recognize what part of a scene presented to the operator includes the actual path of travel for the vehicle and what part of the scene is in the far distance, beyond the sides of the roadway, or otherwise not in the path of travel. However, an autonomous vehicle or driver assistance features of a human-operated vehicle lacks human intuition that may be used to differentiate which objects the vehicle control system should take action to avoid and which may be ignored.

BRIEF SUMMARY

Disclosed embodiments include apparatuses, systems, and methods for determining a field in a path of travel for a vehicle for detection of objects in the path of travel.

In an illustrative embodiment, an apparatus includes a path identifier configured to identify a path of travel for a vehicle. At least one camera is disposed on the vehicle and is configured to capture image data of an area including the path of travel. A region of interest selector is configured to select a region of interest within the image data. A horizon identifier is configured to identify a horizon in the image data. A field determiner is configured to project the horizon onto the region of interest to isolate a field specified by the path of travel and the horizon, the field being evaluatable for the presence of objects in the path of travel of the vehicle.

In another illustrative embodiment, a vehicle includes a cabin configured to receive an operator. A drive system is configured to motivate, accelerate, decelerate, stop, and steer the vehicle. A vehicle control system is configured to perform at least one function chosen from autonomously controlling the vehicle without assistance of the operator and assisting the operator in controlling the vehicle. The vehicle control system includes at least one camera disposed on the vehicle and configured to capture image data of an area including the path of travel. At least one camera is disposed on the vehicle and is configured to capture image data of an area including the path of travel. A region of interest selector is configured to select a region of interest within the image data. A horizon identifier is configured to identify a horizon in the image data. A field determiner is configured to project the horizon onto the region of interest to isolate a field specified by the path of travel and the horizon, the field being evaluatable for the presence of objects in the path of travel of the vehicle.

In a further illustrative embodiment, a computer-implemented method includes identifying a path of travel for a vehicle. Image data of an area including the path of travel is captured using a camera disposed on the vehicle. A region of interest is selected within the image data. A horizon is identified in the image data. The horizon is projected onto the region of interest to isolate a field specified by the path of travel and the horizon, the field being evaluatable for presence of objects in the path of travel of the vehicle.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

The following description explains, by way of illustration only and not of limitation, various embodiments of apparatuses, systems, and computer-implemented methods for determining a field in a path of travel for a vehicle to investigate that field for the presence of objects in the path of travel or for other reasons. The term "field" is used to designate an area of interest in the path of travel of the vehicle that is identified for evaluation using embodiments of the present disclosure.

Figure 1:
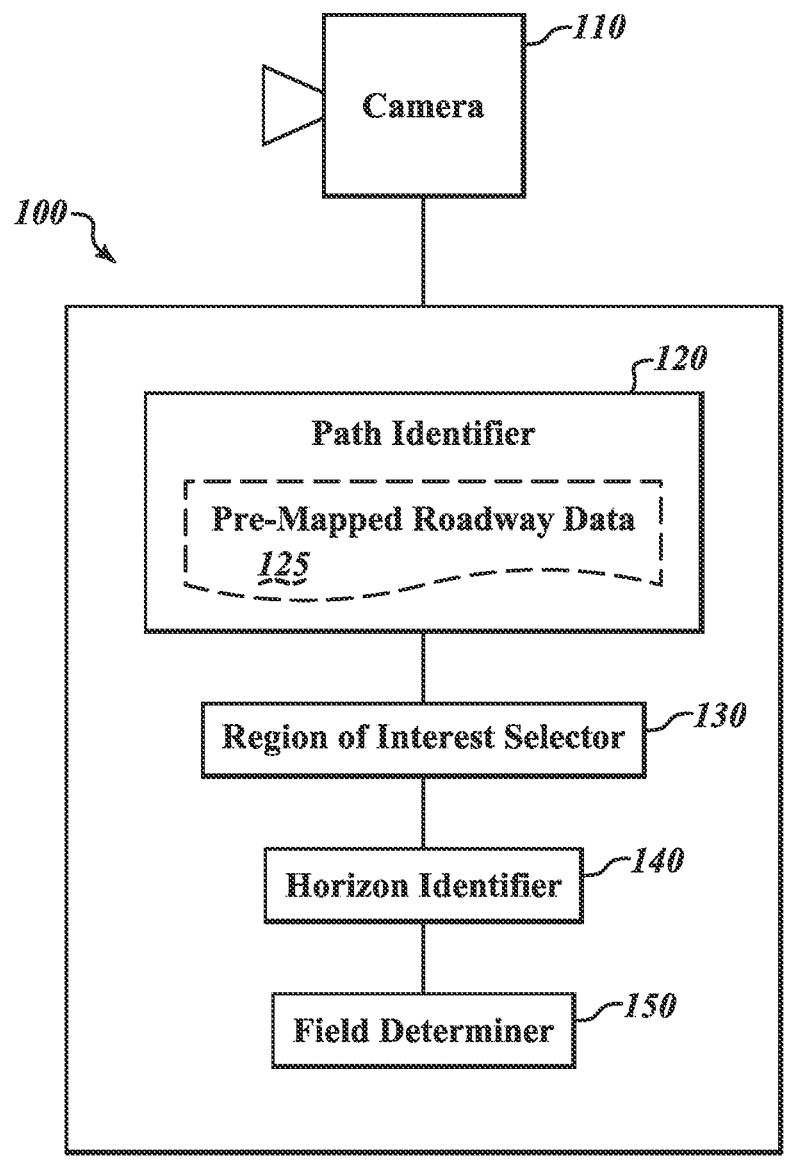
FIG. 1 is a block diagram of an illustrative apparatus for identifying a field in which to search for objects in the path of travel of the vehicle.

According to various embodiments, apparatuses, systems, and computer-implemented methods can help identify fields in image data that are in the path of travel of the vehicle. Referring to FIG. 1, in an illustrative embodiment, an apparatus includes a path identifier 120 is configured to identify a path of travel for a vehicle (not shown in FIG. 1). At least one camera 110 is disposed on the vehicle and is configured to capture image data of an area including the path of travel. A region of interest selector 130 is configured to select a region of interest within the image data captured by the camera 110. A horizon identifier 140 is configured to identify a horizon in the image data. A field determiner 150 is configured to project the horizon onto the region of interest to isolate a field specified by the path of travel and the horizon, the field being evaluatable for the presence of objects in the path of travel of the vehicle.

As further described below, in various embodiments the path of travel may be identified by lane markers discerned from the image data or from pre-mapped roadway data. A horizon may be identified in the image data by using a gradient and color-based approach. The horizon may be projected onto the region of interest to isolate a field specified by the path of travel and the horizon. The field may be evaluated for presence of objects in the path of travel of the vehicle, for example, by comparing the field with a library of image data of objects that may be present in the path of travel.

Figure 2:
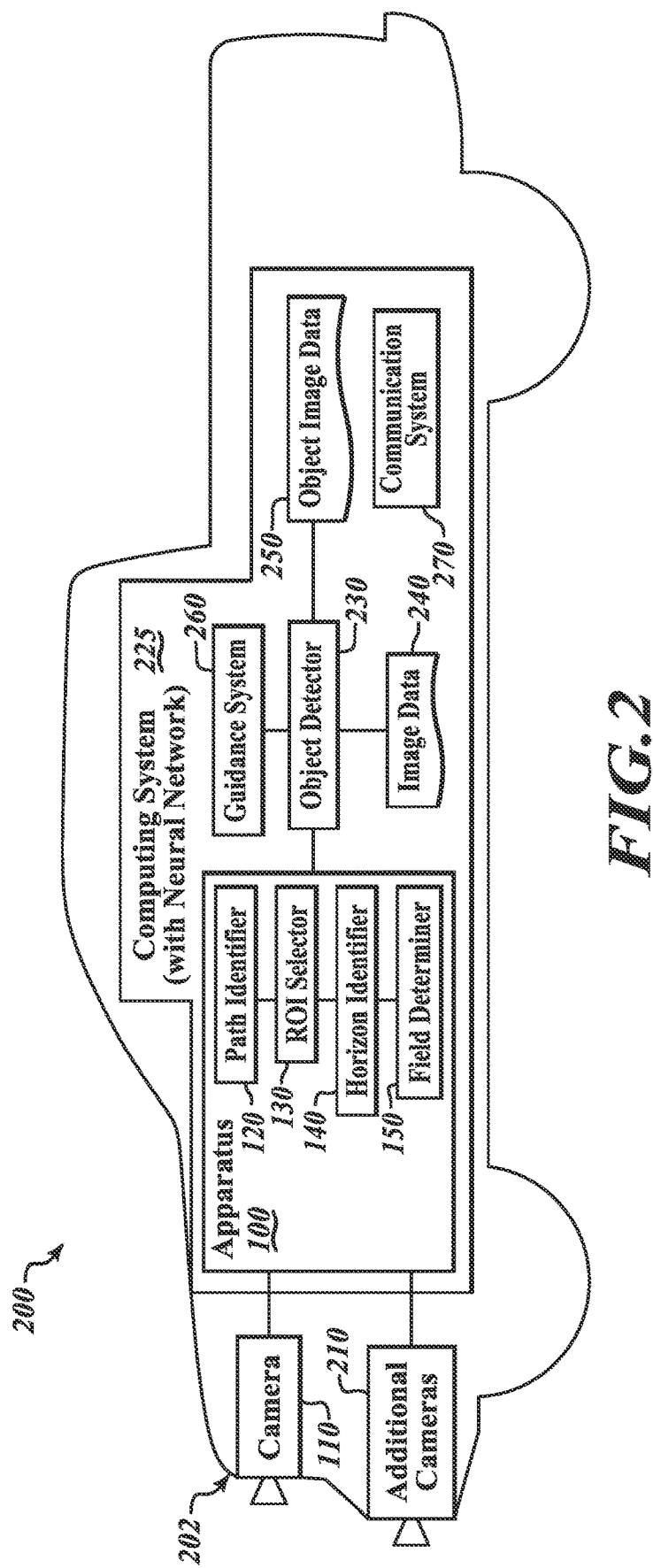
FIG. 2 is a diagram in partial schematic form of an illustrative vehicle that includes the apparatus of FIG. 1.

Referring to FIG. 2, a vehicle 200 includes onboard systems to detect and avoid objects in the path of travel. The vehicle 200 may include a car, truck, sport utility vehicle (SUV), or similar vehicle for on-road and/or off-road travel. The vehicle has an onboard computing system 225 that supports an embodiment of the apparatus 100 of FIG. 1, including the path identifier 120, region of interest selector 130, horizon identifier 140, and field determiner 150. In various embodiments, for example, the onboard computing system 225 may be implemented using any number of architectures. For example, the onboard computing system 225 may include a neural network or similar system directed to machine learning which can be programmed to analyze or categorize input data sets based on provided training data sets.

In various embodiments the camera 110 is mounted to a forward end 202 of the vehicle to capture image data 240 of the path of travel of the vehicle. It may be desirable to include one or more additional cameras 210 mounted on the vehicle 200 to monitor the path of travel of the vehicle. The one or more additional cameras 210 may be used to provide additional sources of image data as a backup or providing additional or enhanced image data for use by the apparatus 100, such as by providing image data from multiple perspectives, at different focal lengths, having different fields of view, or providing image data having other different properties. However, in various embodiments, processes herein described may be performed using a single camera 110.

The image data 240 captured by the camera 110 and/or additional cameras 210 is provided to the computing system 225 where it may be stored temporarily or for any specified duration and may be analyzed by the apparatus 100 or other systems. As previously mentioned, the image data 240 is processed by the path identifier 120, the region of interest selector 130, the horizon identifier 140, and the field determiner 150 to identify fields to be evaluated for the presence of objects or obstacles in the path of travel of the vehicle 200.

As also further described below, an object detector 230 may access the image data 240 as well as a store of object image data 250. The object image data 250 includes image data of objects or obstacles that may be encountered in the path of travel of the vehicle 200 that should be avoided. The object detector 230 may compare regions identified by the field determiner 150 against the store of object image data 250 to determine the presence of objects or obstacles to be avoided. When the object detector identifies such objects or obstacles in the path of travel of the vehicle 200, a signal is provided to a guidance system 260. In some embodiments, the guidance system 260 may alert an operator as to the presence of the object or obstacle so that the operator may avoid the object or obstacle. In some other embodiments, when the vehicle 200 is under autonomous control, the guidance system 260 may automatically change the course and/or speed of the vehicle 200 to avoid colliding with the object or obstacle.

In various embodiments, the computing system 225 aboard the vehicle 200 also includes a communications system 270. The communications system 270 enables the computing system 225 to exchange data, such as data from the image data 240 and/or the object image data with a network (not shown in FIG. 2). The communications system 270 may be a wireless communications system operable to communicate over cellular data networks, satellite networks, or similar networks. When stationary, the vehicle 200 also may be docked to enable wired communications. The communications system 270 thus allows the computing system 225 and its subsystems to receive updated data, such as updates to the object image data 240, data relating to a current location, such as pre-mapped roadway data 125 (FIG. 1), programming updates, or other updates.

Figure 3:
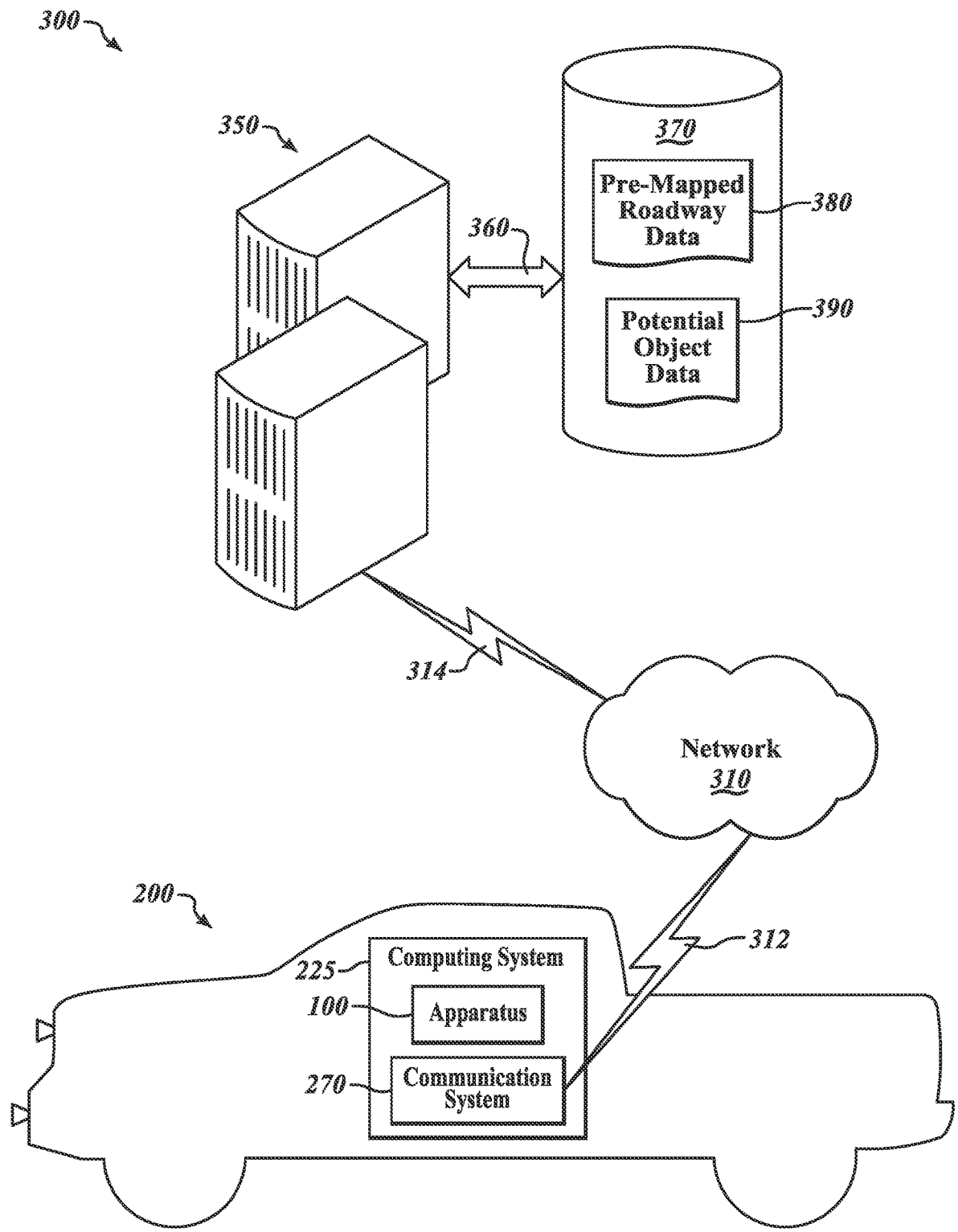
FIG. 3 is a diagram in partial schematic form of an illustrative network that includes the vehicle of FIG. 2.

Referring to FIG. 3, an operating environment 300 of the apparatus 100 is described. As described with reference to FIG. 2, a computing system 225 aboard the vehicle 200 includes a communication system 270 that enables the computing system 225 to communicate over a network 310 with one or more server systems 350 to send or receive data. The network 310 may include the Internet or another network. The communications system 270 of the computing system 225 and the server systems 350 communicate over the network 310 using wired or wireless communications links 312 and 314, respectively. Because the communication system 270 of the computing system 225 is aboard a mobile vehicle 200, it will be appreciated that the communications link 312 typically will be a wireless communications link, such as a cellular communications link, a satellite network communications link, or some other wide-area communications link.

The server systems 350 communicate over high-speed channels 360 with storage devices 370. The storage devices 370 include stores of pre-mapped roadway data 380, stores of potential object data 390, and other data that may be used to supplement or update data on the computing system 225 aboard the vehicle 200. Thus, for example, the pre-mapped roadway data 125 stored in the path identifier 110 may be updated. The updates may reflect changes in roadways or the condition thereof. Correspondingly, if other data is updated, such as if the potential object data 390 is updated to refine or add data representing objects that may be encountered in a roadway, the updates may be downloaded across from one of the server systems 350 via the network 310 to the computing system 225 aboard the vehicle 200.

Figure 4:
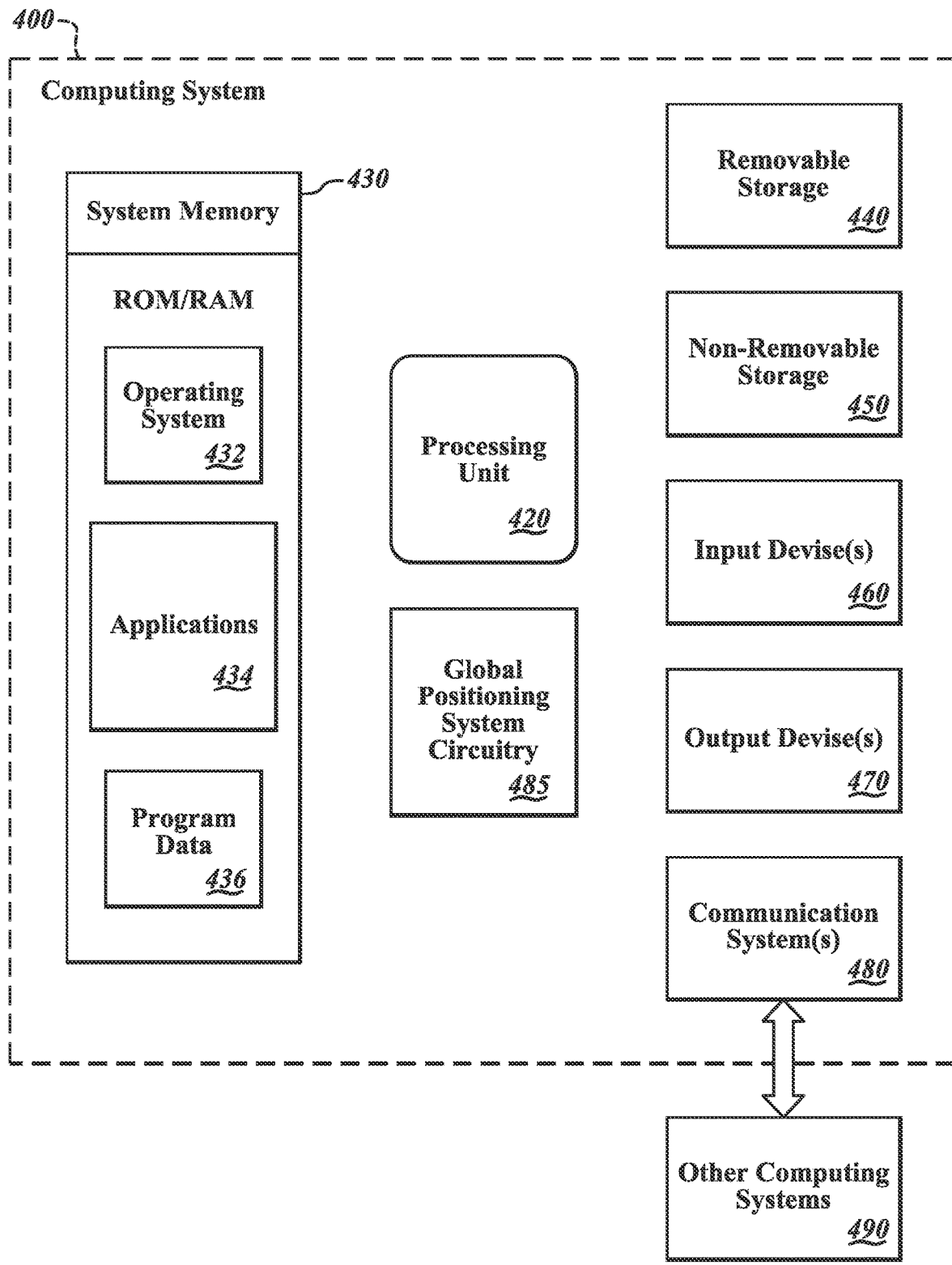
FIG. 4 is a block diagram of an illustrative computing system that is a component of the network of FIG. 3.

Referring to FIG. 4 and given by way of illustration only and not of limitation, some form of an illustrative computing system 400 may be used for the computing system 225 aboard the vehicle 200, for the server systems 350, or other computing systems (not shown) working with the computing system 225 or the server systems 350. In various embodiments, the computing system 400 typically includes at least one processing unit 420 and a system memory 430. Depending on the exact configuration and type of computing device, the system memory 430 may be volatile (such as random-access memory ("RAM"), non-volatile (such as read-only memory ("ROM"), flash memory, and the like) or some combination of volatile memory and non-volatile memory. The system memory 430 typically maintains an operating system 432, one or more applications 434, and program data 436. The operating system 432 may include any number of operating systems executable on desktop or portable devices including, but not limited to, Linux, Microsoft Windows®, Apple OS®, or Android®.

The computing system 400 may also have additional features or functionality. For example, the computing system 400 may also include additional data storage devices (removable and/or non-removable) such as, for example, magnetic disks, optical disks, tape, or flash memory. Such additional storage is illustrated in FIG. 4 by removable storage 440 and non-removable storage 450. Computer storage media may include volatile and non-volatile, removable and non-removable media implemented in any method or technology for storage of information, such as computer-readable instructions, data structures, program modules or other data. The system memory 430, the removable storage 440, and the non-removable storage 450 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 400. Any such computer storage media or other forms of storage media may be part of the computing system 400.

The computing system 400 may also have input device(s) 460 such as a keyboard, mouse, pen, voice input device, touchscreen input device, etc. Output device(s) 470 such as a display, speakers, printer, short-range transceivers such as a Bluetooth transceiver, etc., may also be included. The computing system 400 also may include one or more communication systems 480 that allow the computing system 400 to communicate with other computing systems 490, for example, as the computing system 225 aboard the vehicle 200 communicates with the server system 350 and vice versa. As previously mentioned, the communication system 480 may include systems for wired or wireless communications. Available forms of communication media typically carry computer-readable instructions, data structures, program modules, or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, RF, infrared and other wireless media. The term computer-readable media as used herein includes both storage media and communication media.

In further reference to FIG. 4, the computing system 400 may include global positioning system ("GPS") circuitry 485 that can automatically discern its location based on relative positions to multiple GPS satellites. As described further below, GPS circuitry 485 may be used to automatically report a location of the vehicle 200, which may be used to push mapping data or other object data to the computing system 225 aboard the vehicle 200.

Operation of embodiments of the present disclosure for identifying a field in a path of a vehicle is described with reference to an example described with reference to FIGS. 5-15. In the example of FIGS. 5-15, the vehicle 200 (FIG. 2) travels a particular route which is evaluated by the apparatus 100 (FIGS. 1 and 2) which identifies fields that may be evaluated for presence of objects that should be avoided. As previously described, upon identifying a field in which an object is located, a signal is sent to the guidance system 260 (FIG. 2) to alert the operator of the vehicle to avoid the object or to automatically adjust the course or speed of the vehicle 200 to avoid the object.

Figure 5:
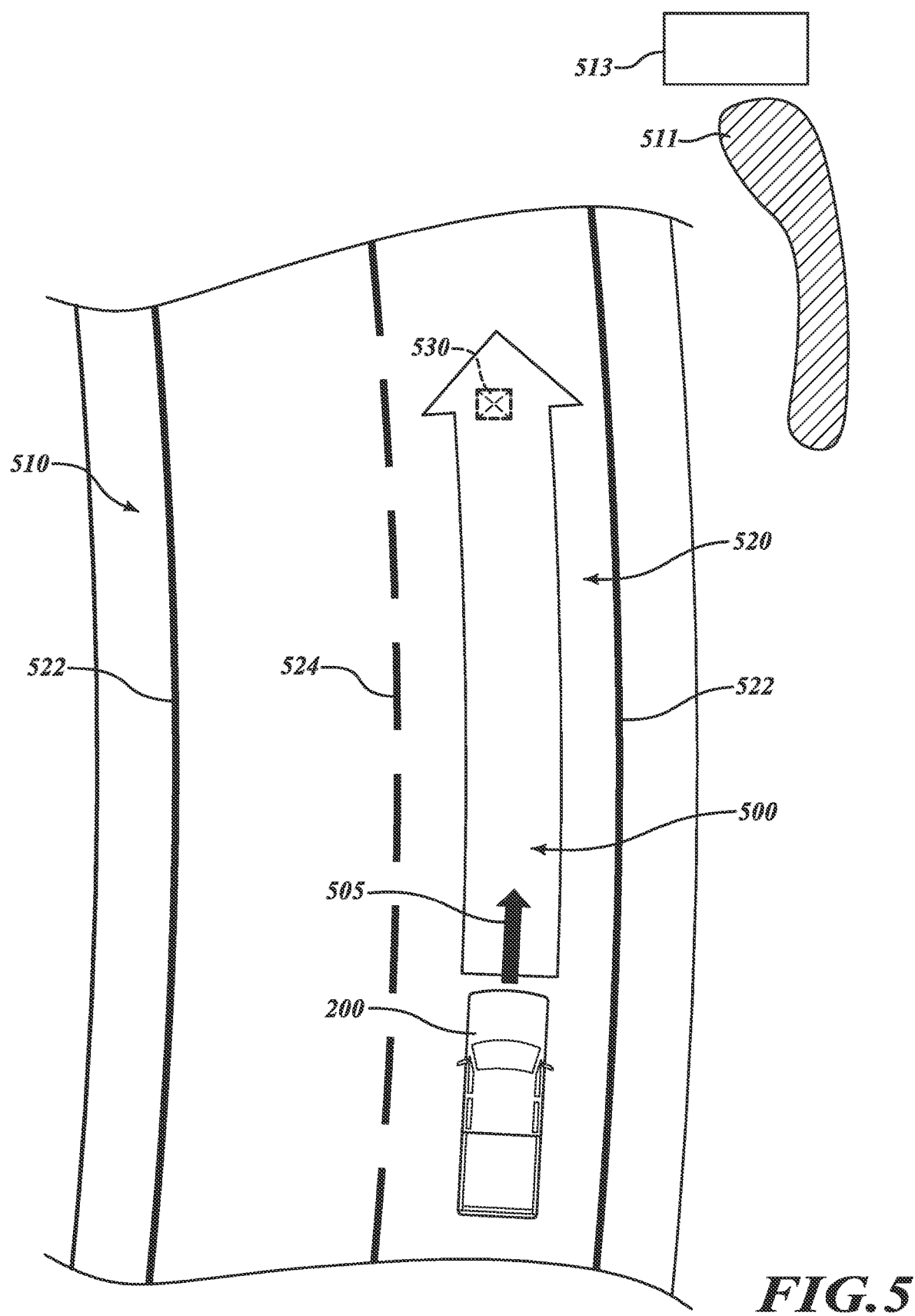
FIG. 5 is a top-down schematic diagram of a route of travel of a vehicle.

Referring to FIG. 5, the vehicle 200 moves along a route 500. In the example of FIG. 5, the route 500 is along a roadway 510 and, in particular, within a marked lane 520 of the roadway 510. The marked lane 520 is bounded on a first side by a solid line 522, as is commonly used to mark an outer edge of a roadway 510. On a second side, the marked lane 520 is bounded by a dotted line 524, such as is commonly to divide multiple lanes traveling in a same direction or to divide opposing lanes on a two-lane road where passing is permitted.

In the example of FIG. 5, an object 530 which the vehicle 200 should avoid is present in the route 500. The object 530 may be discernible by the camera 110 (FIGS. 1 and 2) as lying in the route 500 ahead of the vehicle 200. In the simple example of FIG. 5, with the object 530 having been detected by the camera 110, it may appear a simple matter to change the heading or speed of the vehicle 200 to avoid the object 530, as human vehicle operators do on a regular basis. However, what may be a simple action for a human operator involves recognizing when the object 530 is actually within the route 500. Looking in the direction of travel 505, a human operator or the camera 110 may see objects such as foliage 511 or a structure 513 that are in the direction of travel 505. However, the objects 511 and 513 may not actually be present in the route 500 being travelled by the vehicle 200 and do not actually have to be avoided, as further described with reference to FIG. 6.

Figure 6:
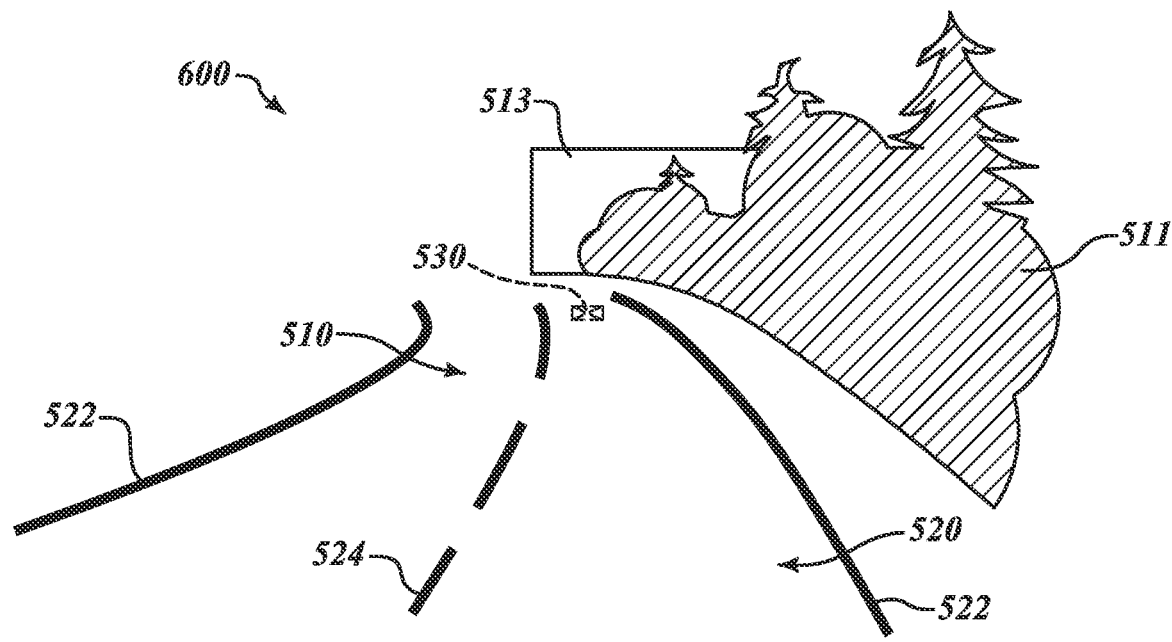
FIGS. 6-8 are schematic views of image data of a roadway.

Referring to FIG. 6, image data 600 captured by the camera 110 from the vehicle 200 (neither of which is shown in FIG. 6) shows a number of objects that appear to be within the roadway 510 ahead of the vehicle 200. In addition to the object 530, the view of the route ahead of the vehicle 500 includes the foliage 511 and the structure 513, which may be a building, a natural formation, or some other body. Evaluating the image data 600, it would appear that the object 530, the foliage 511, and the structure 513 all are present in the roadway 510 and should be avoided. A human operator may intuitively be able to discern that only the object 530 is actually within the roadway 510, while the foliage 511 and the structure 513 are outside the roadway 510. However, the fact that the foliage 511 and the structure 513 are not actually obstacles in the roadway 510 is not clear from the view 600 captured by the camera 110.

Figure 7:
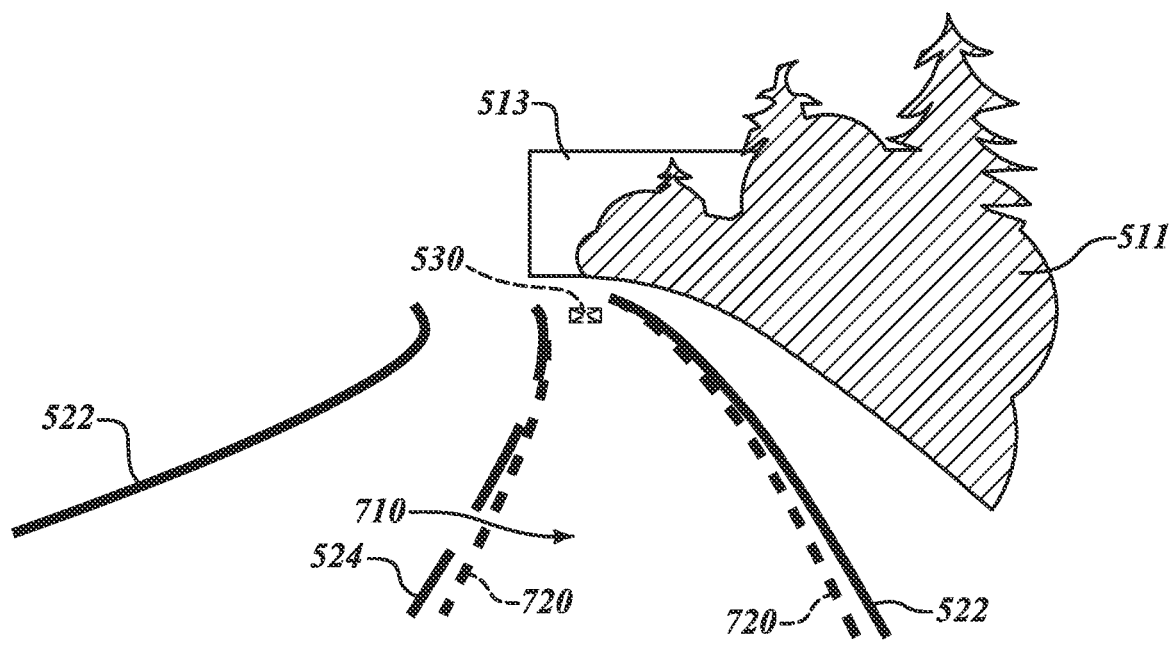

Referring to FIG. 7, as part of discerning what objects actually are present in a path of travel 710, the path identifier 120 identifies a path of travel 710 of the vehicle 200. In various embodiments, the path of travel 710 is discerned by identifying lane markers on the roadway 510, such as the solid line 522 at one side of the marked lane 520 and the dotted line 524 on the other side of the marked lane 520. Boundaries 720 of the path of travel 710 thus may be set at or adjacent to the identified lane markers 522 and 524. The path identifier 120 thus may use visual data captured by the camera 110 to identify the path of travel 710.

Figure 8:
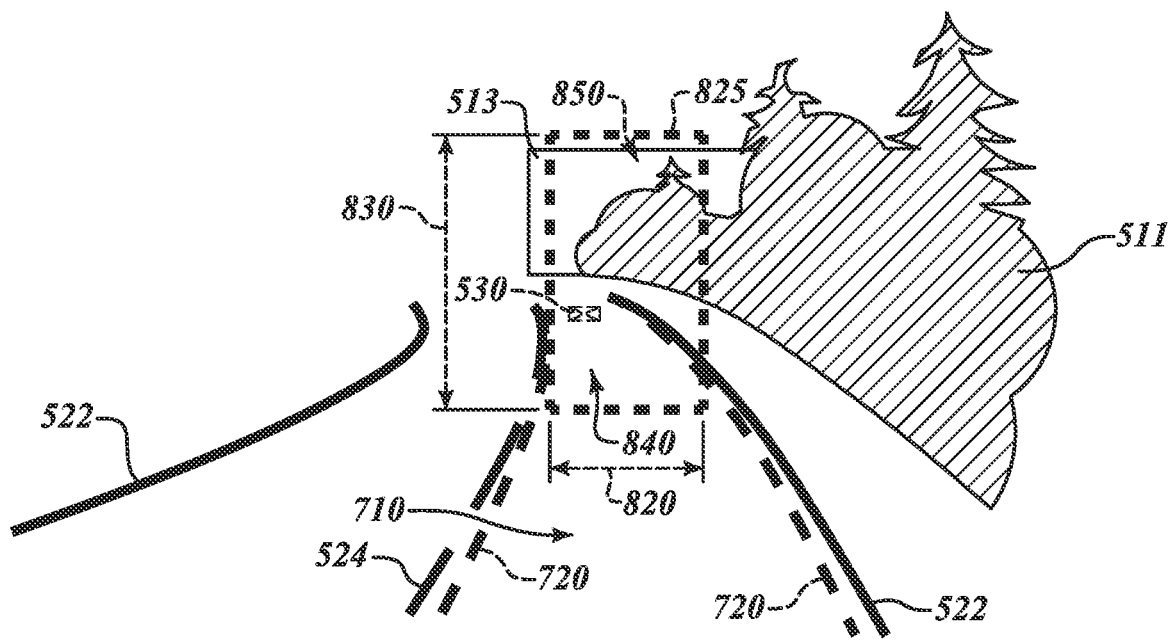

Referring to FIG. 8, with the boundaries 720 of the path of travel 710 identified by the path identifier 120, the region of interest selector 130 identifies a region of interest 825 within the path of travel 710 for further analysis. The region of interest 825 represents a two-dimensional area in which a horizon of the path of travel 710 may be located. The boundaries 720 of the path of travel 710 determine a horizontal width 820 of the region of interest 825. The vertical height 830 of the region of interest 825 may be a fixed range or may be dynamically determined based on the width 820 of the region of interest 825.

The height 830 of the region of interest 825 may be determined by selecting a range of increased contrast values to help to narrow the region of interest to a range where a horizon is likely to be identified, as further described below. There may be homogeneous portions of visual data within the region of interest 825 at a lower end 840 and/or at an upper end 850 of the region of interest 825 that may include a portion of roadway directly in front of the vehicle or sky and/or terrain relatively far in the distance. By filtering out the homogeneous portions of visual data within the region of interest 825 at the lower end 840 and/or at the upper end 850 of the region of interest 825, a size of the region of interest 825 may be reduced, thereby reducing the amount of data to be analyzed by the horizon identifier 140, as further described below.

It will be appreciated that a vehicle may operate in many locations where there are no lane markers from which a path of travel may be identified. For example, many residential streets and rural routes do not have markings on the road. Similarly, unpaved roads or off-road courses do not have lane markings. To aid in identifying the path of travel in such areas, as referenced in FIG. 1, the path identifier 120 may include pre-mapped roadway data 125. The pre-mapped roadway data 125 may use position data from the GPS circuitry 485 (FIG. 4) to identify where the vehicle is located and, from the pre-mapped roadway data 125, identify the path of travel.

Figure 9:
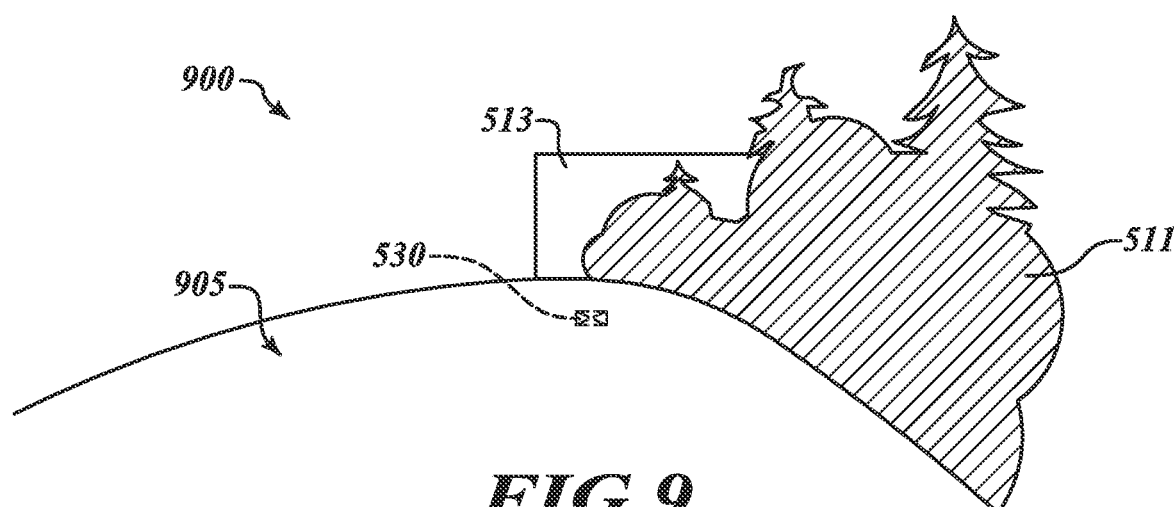
FIGS. 9-11 are schematic views of image data of route of travel.

Referring to FIG. 9, image data 900 captured by the camera 110 aboard the vehicle 200 (neither of which is shown in FIG. 9) shows an open area 905 without lane markings. The image data 900 also captures image data of other objects, such as the object 530 (FIG. 5) which the vehicle should avoid, as well as the foliage 511 and the structure 513 which are not actually in the route of the vehicle.

Figure 10:
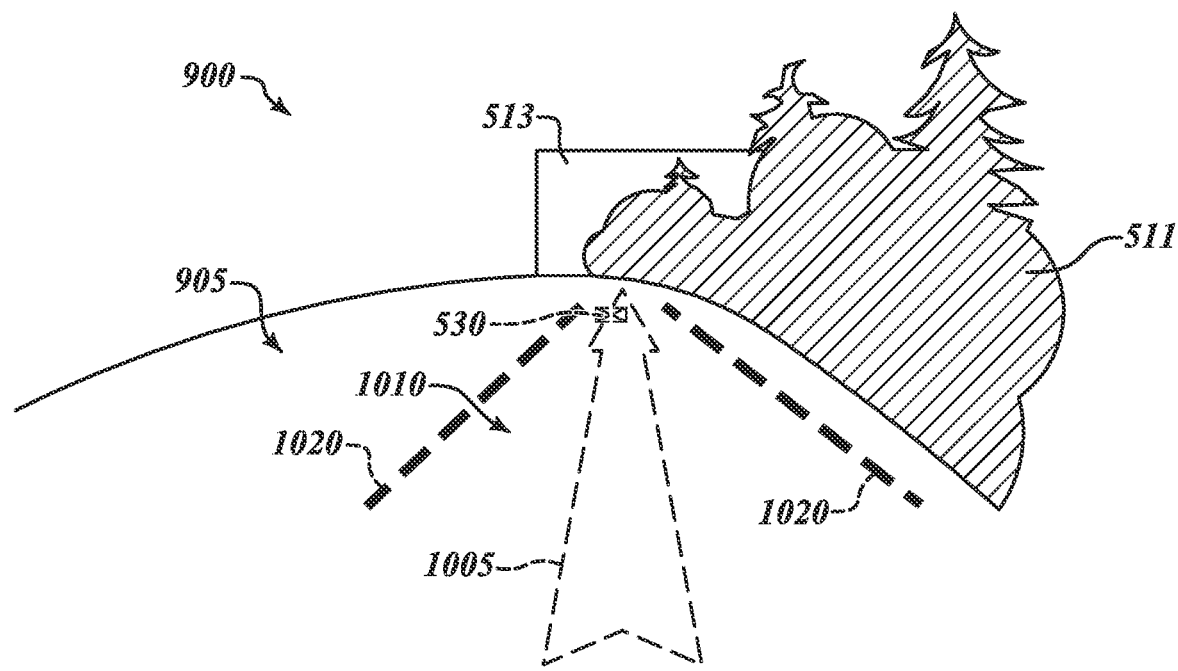

Referring to FIG. 10, without lane markings, the path identifier 120 accesses pre-mapped roadway data 125 and uses position data from the GPS circuitry 485 to identify where the vehicle is situated on the position data and the heading of the vehicle, the path identifier 120 projects a route 1005 of the vehicle on the image data 900. From the route 1005 projected, the path identifier 120 identifies boundaries 1020 of the path of travel 1010.

Figure 11:
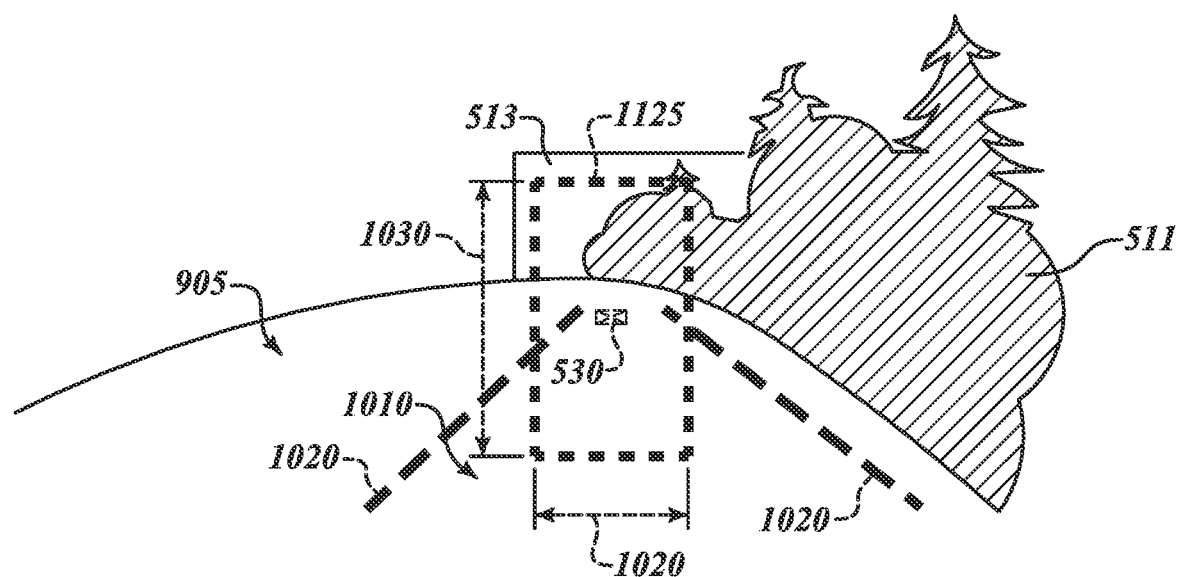

Referring to FIG. 11, with the boundaries 1020 of the path of travel 1010 identified by the path identifier 120, the region of interest selector 130 identifies a region of interest 1125 within the path of travel 1010 for further analysis. As described with reference to FIG. 8, the region of interest 1125 represents a two-dimensional area in which a horizon of the path of travel 1010 may be located. The boundaries 1020 of the path of travel 1010 determine a horizontal width 1020 of the region of interest 1125. The vertical height 1030 of the region of interest may be a fixed range or may be dynamically determined based on the width 1020 of the region of interest 1025. Further alternatively, the height 1030 of the region of interest 1025 may be determined by selecting a range of increased contrast values to help to narrow the region of interest 1025, as previously described with reference to FIG. 8.

Figure 12:
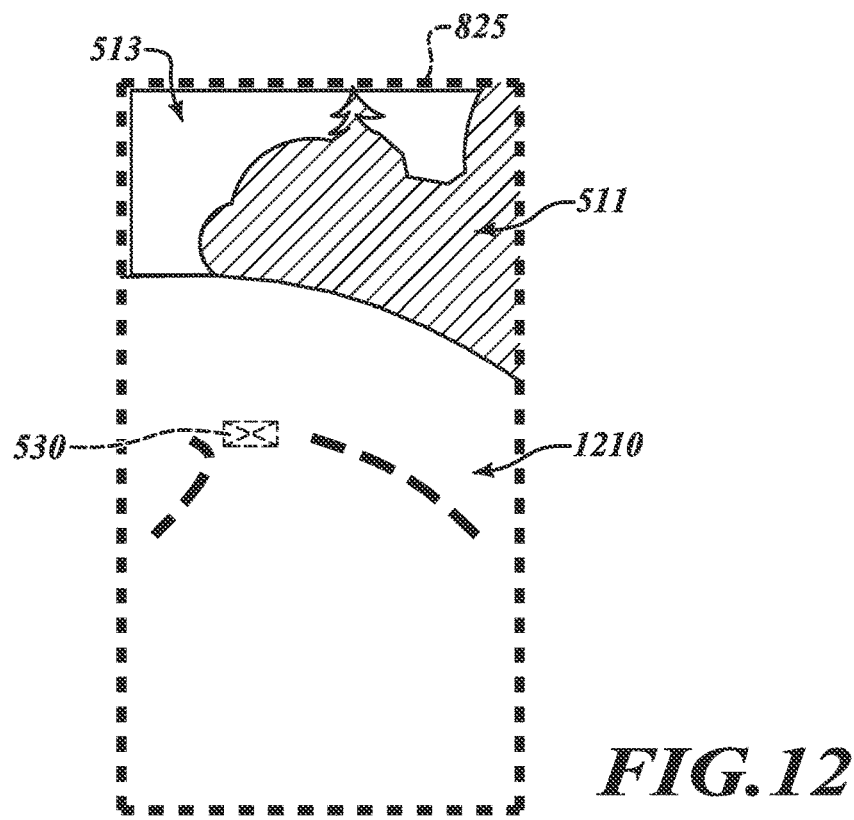
FIGS. 12-13 are schematic views of the image data of FIG. 8 from which a horizon is identified within the region of interest.

Referring again to the example of FIGS. 6-8, with the region of interest 825 representing the area ahead of the vehicle, the horizon identifier 140 identifies a location of the horizon within the region of interest 825 to identify objects that need to be avoided. Referring to FIG. 12, the region of interest 825 represents an area 1210 ahead of the vehicle. As previously described with respect to FIGS. 6-8, even though the region of interest 825 isolates the area actually ahead of the vehicle, but still includes objects such as the foliage 511 and the structure 513 which are outside the path of travel of the vehicle and do not need to be avoided, By contrast, the object 530 is in the path of travel and is to be avoided.

Figure 13:
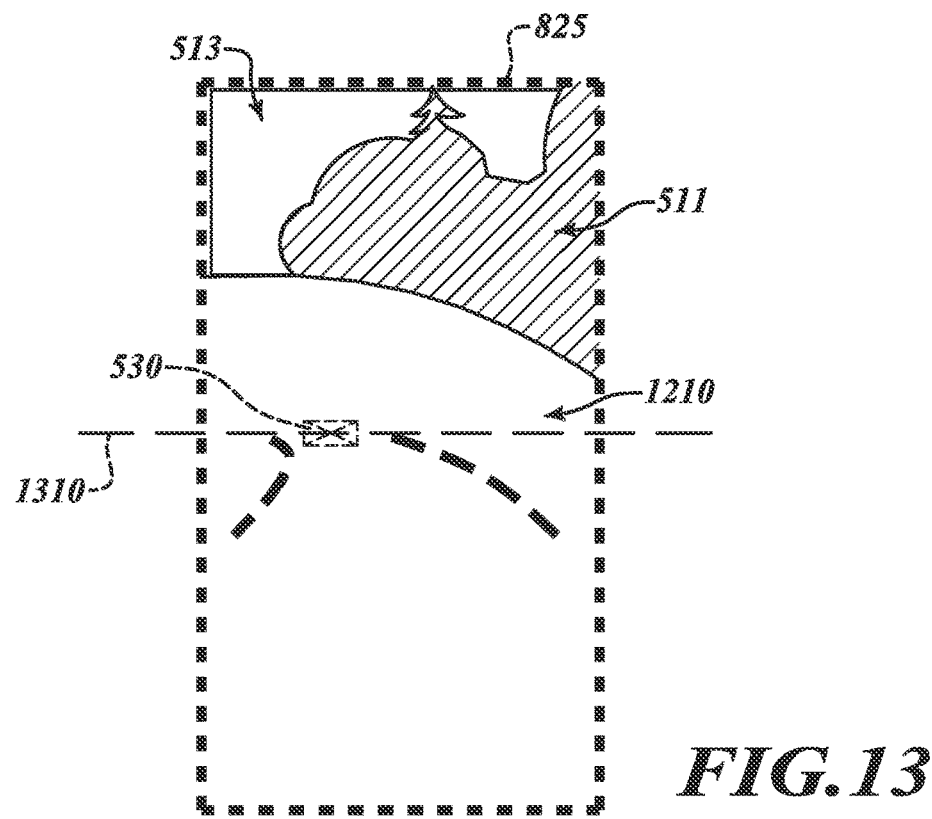

Referring to FIG. 13, the horizon identifier 140 identifies where a horizon 1310 lies across the region of interest 825. In various embodiments, the horizon identifier 140 uses a gradient and color-based approach to identify the horizon. The change in data values between pixels in the image data within the region of interest is most pronounced—where the gradient and/or color change is highest—at and around the horizon, as compared to the change in data values between pixels removed from the horizon is less pronounced. The horizon identifier 140 identifies the horizon 1210 across the region of interest 825 where indicated by the gradient and color-based approach or where another approach identifies a level of contrast indicative of the horizon 1210.

Figure 14:
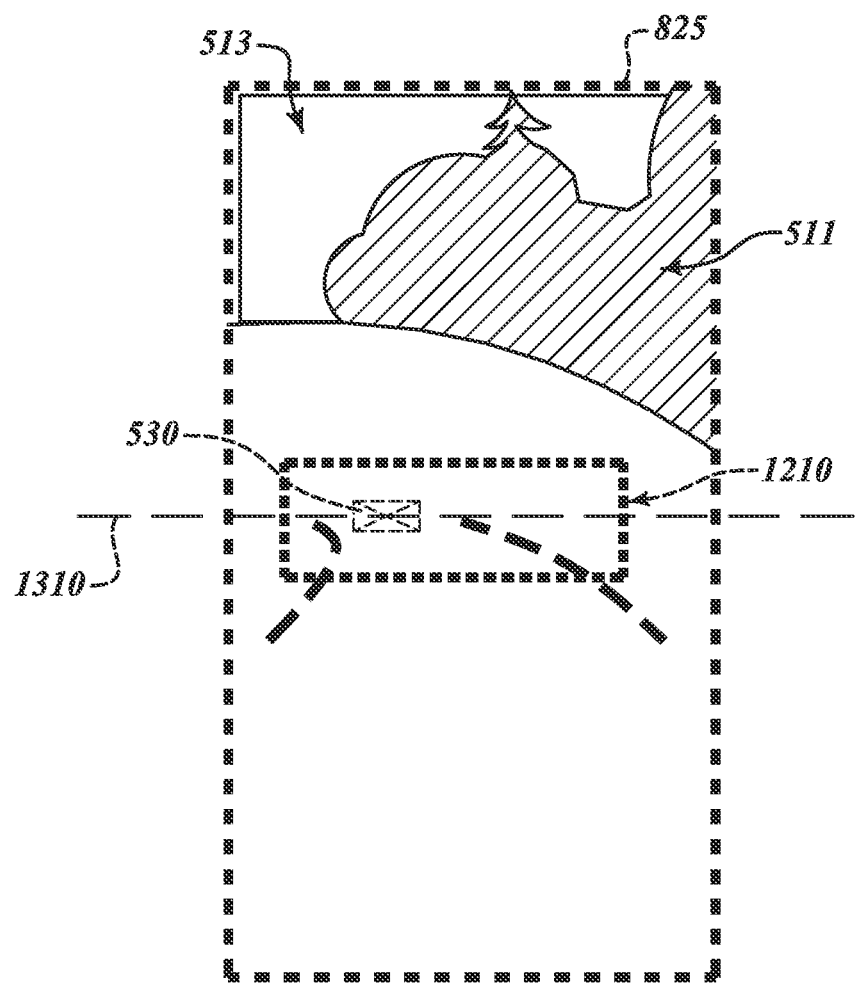
FIG. 14 is a schematic view of a field specified by the path of travel and the horizon.

Referring to FIG. 14, the field determiner 150 then defines a field 1410 at a location across the region of interest at or around the horizon 1210. Where the horizon 1210 crosses the region of interest 825 is a location in the path of travel (not shown in FIG. 14) that is to be evaluated for the presence of objects that may need to be avoided, as further described below. As shown in FIG. 14, the object 530 is in the field 1410. By contrast, objects such as the foliage 511 or the structure 513, which are not in the path of travel of the vehicle, are outside the field 1410. Thus, by determining the appropriate field 1410 within the image data captured by the camera 110, a relevant portion of the image data can be examined for the presence of objects to be avoided.

Figure 15:
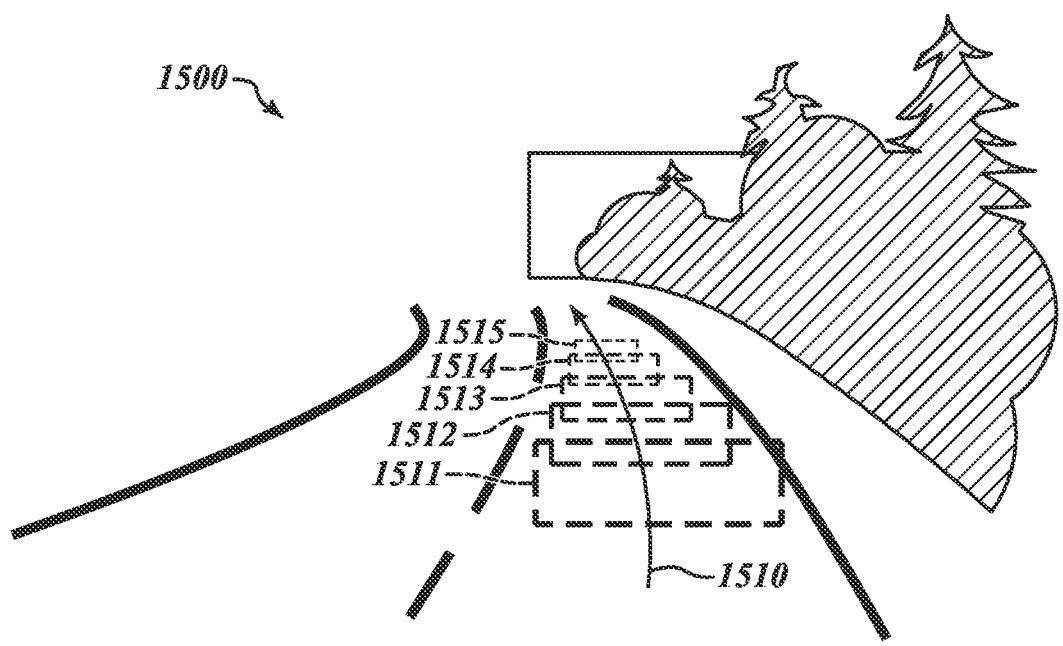
FIG. 15 is a schematic view of additional fields.

Referring to FIG. 15, as a vehicle (not shown in FIG. 15) advances along a route 1510, the process described with reference to FIGS. 6-14 is repeated, with a series of fields 1511-1515 being determined by the field determiner 150. Each of the fields 1511-1515 in turn is examined for the presence of objects to be avoided, as described with reference to FIGS. 16-18.

In various embodiments, instead of the fields 1511-1515 being independently determined within each region of interest, it will be appreciated that a horizon identified in one region of interest may be tracked across subsequent regions of interest to identify the fields. Thus, once the horizon (not shown in FIG. 15) is identified using a gradient and color-based approach or other approach to determine a field 1511, the horizon may be tracked across each subsequently identified region of interest to identify subsequent fields 1511-1515.

Figure 16:
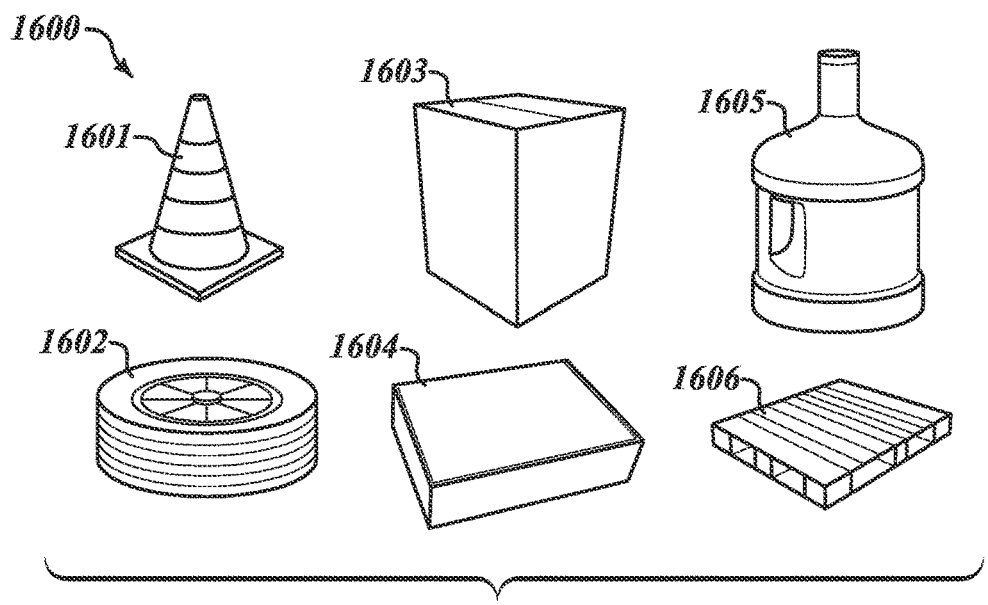
FIG. 16 is a schematic view of illustrative objects encounterable in a path of travel.

Referring to FIG. 16, a set of object data 1600 is used by the computing system 225 aboard the vehicle 200 to examine fields for the presence of objects. The set of object data 1600 may include a large number of different objects representing the types of debris that might be encountered within the path of travel, and may include each of these objects at a number of different orientations and under different lighting conditions. For example, the set of object data 1600 may include a traffic cone 1601, a tire 1602, different sized boxes 1603 and 1604, other containers 1605, and pallets or other wooden items 1606.

Figure 17:
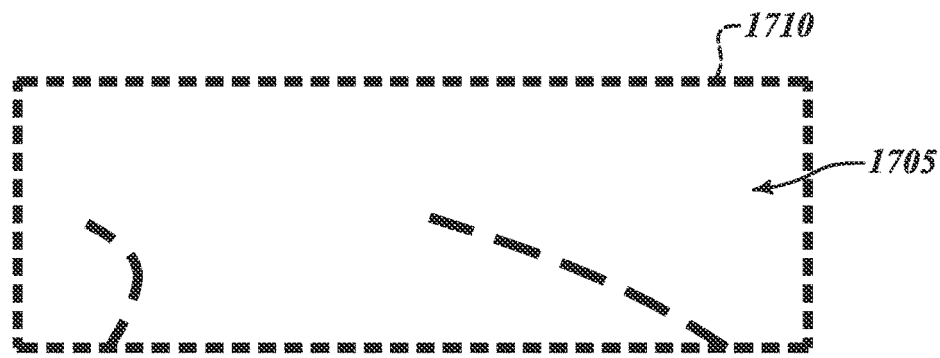
FIG. 17 is a schematic view of a field including no objects.
Figure 18:
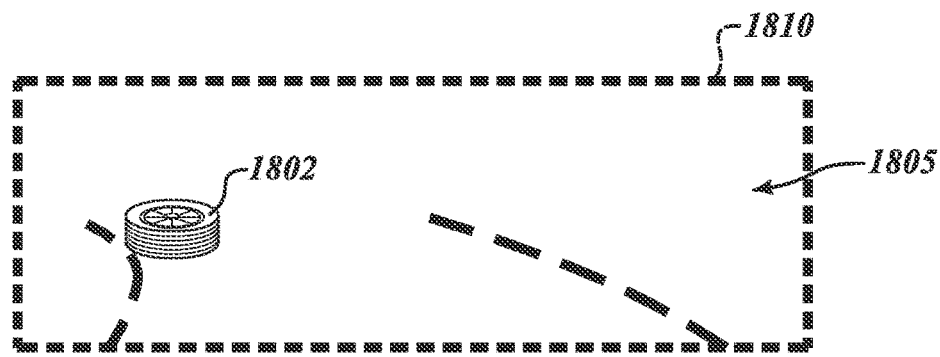
FIG. 18 is a schematic view of a field including an identifiable object.

Referring to FIGS. 17 and 18, in a case where the computing system 225 includes a neural network, the neural network evaluates image data 1705 and 1805 within each current field 1710 and 1810, respectively, to determine the likelihood of any of the objects in the set of object data 1600. Referring to FIG. 17, image data within the field 1710 does not include data indicative of any objects in the set of object data 1600 (FIG. 16). Thus, no signal will be sent to the guidance system 260 (FIG. 2) to call for or cause a change in course or speed to avoid an object. Referring to FIG. 18, the image data 1805 in the field 1810 data 1820 that is likely to correspond to the object 1602 in the set of object data 1600. Thus, a signal will be sent to the guidance system 260 to call for or cause a change in course or speed to avoid an object.

Figure 19:
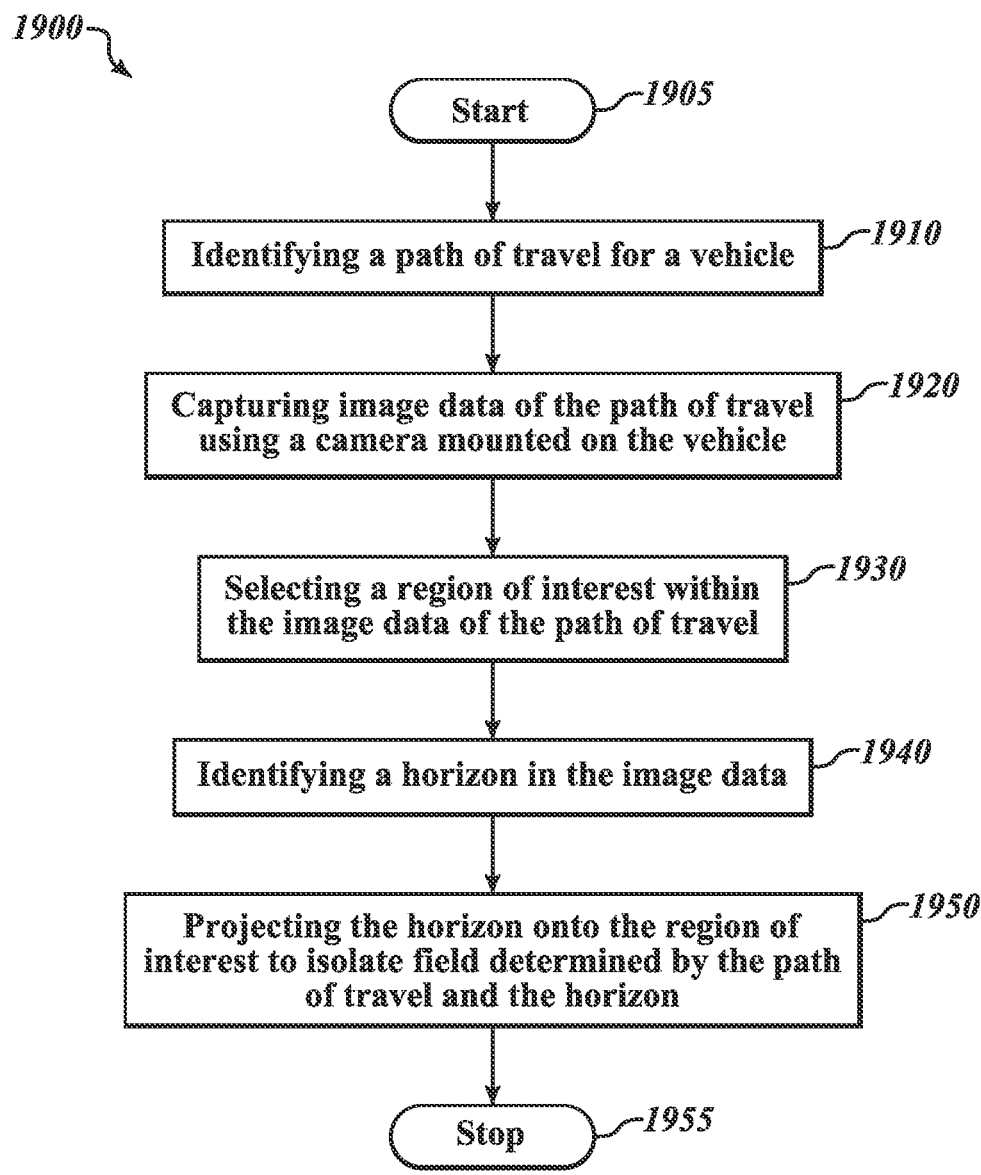
FIG. 19 is a flow chart of an illustrative method of identifying a field in a path of travel of a vehicle in which objects may be identified.

Referring to FIG. 19, an illustrative method 1900 of identifying a field to be evaluated is provided. The method 1900 starts at a block 1905. At a block 1910, a path of travel for a vehicle is identified, as described with reference to FIGS. 5-7, 9, and 10. At a block 1920, image data is captured by a camera mounted on the vehicle. At a block 1930, a region of interest within the image data of the path of travel is selected, as previously described with reference to FIGS. 8 and 11. At a block 1940, a horizon is identified in the image data, as described with reference to FIGS. 12-14. At a block 1950, the horizon is projected onto the region of interest to isolate a field determined by the path of travel and the horizon, as described with reference to FIG. 14. The method 1900 ends at a block 1955.

Figure 20:
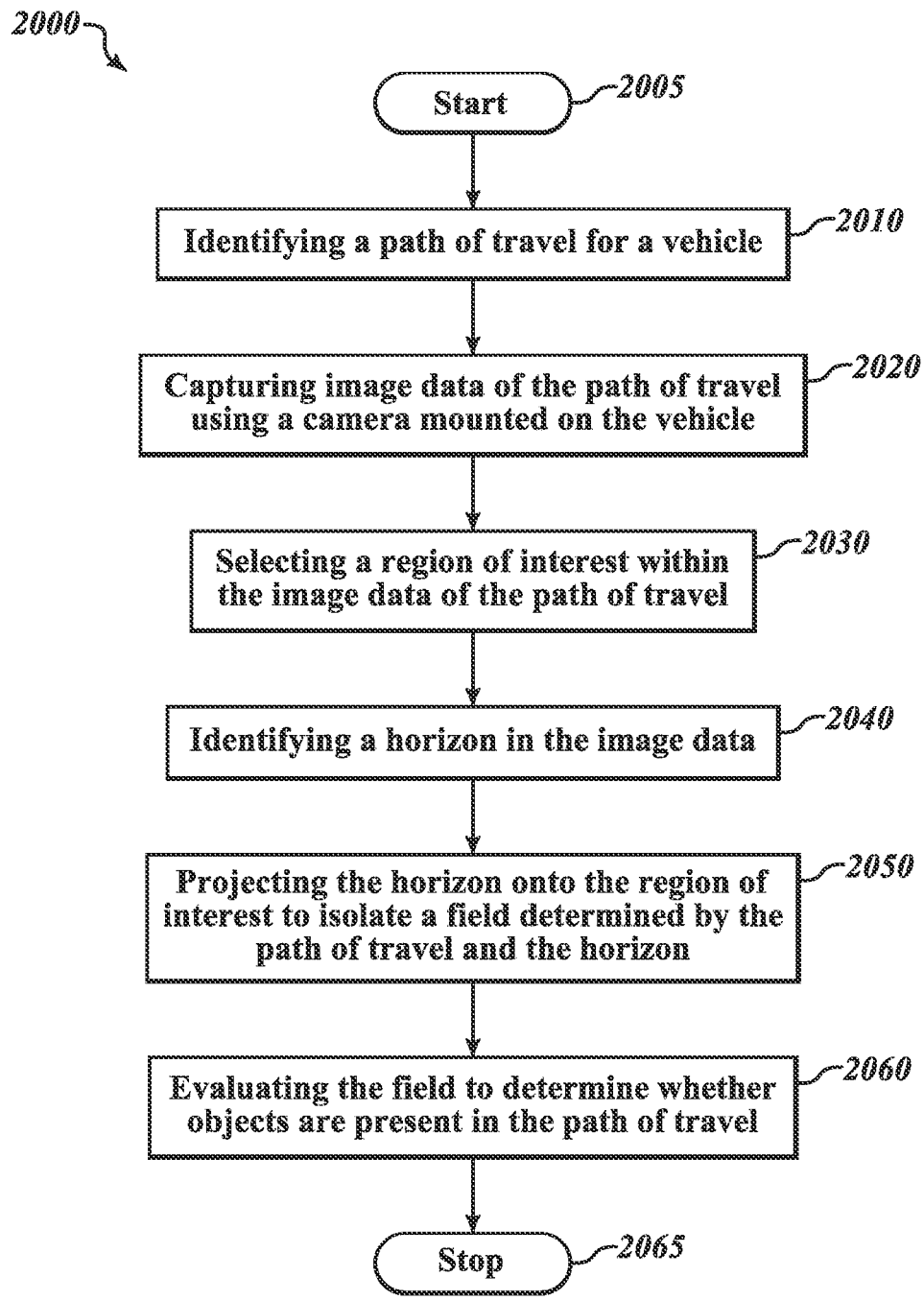
FIG. 20 is a flow chart of an illustrative method of identifying a field in a path of a vehicle and evaluating the field to determine whether one or more objects is present in the field.

Referring to FIG. 20, an illustrative method 2000 of identifying a field to be evaluated for the presence of objects is provided. The method 2000 starts at a block 2005. At a block 2010, a path of travel for a vehicle is identified, as described with reference to FIGS. 5-7, 9, and 10. At a block 2020, image data is captured by a camera mounted on the vehicle. At a block 2030, a region of interest within the image data of the path of travel is selected, as previously described with reference to FIGS. 8 and 11. At a block 2040, a horizon is identified in the image data, as described with reference to FIGS. 12-14. At a block 2050, the horizon is projected onto the region of interest to isolate a field determined by the path of travel and the horizon, as described with reference to FIG. 14. At a block 2060, the field is evaluated to determine whether objects are present in the path of travel, as described with reference to FIGS. 16-18. The method 2000 ends at a block 2065.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
    a path identifier configured to identify a path of travel for a vehicle;
    at least one camera disposed on the vehicle configured to capture image data of an area including the path of travel;
    a region of interest selector configured to select a region of interest within the image data, wherein the region of interest has a horizontal width that is specified by the path of travel and has a vertical height that is specified by filtering out visually homogeneous portions of the region of interest;
    a horizon identifier configured to identify a horizon in the region of interest; and
    a field determiner configured to project the horizon onto the region of interest to isolate a field within the region of interest specified by the path of travel and the horizon, the field being evaluatable for presence of objects.

2. The apparatus of claim 1, wherein the field determiner includes a neural network executable on a computing system aboard the vehicle.

3. The apparatus of claim 1, wherein the path identifier is configured to identify the path of travel by using at least one path indicator chosen from:
    at least one lane marking on a roadway detected in the image data of the area including the path of travel by one of the at least one camera and additional image data captured by at least one additional camera disposed on the vehicle; and
    a route included in pre-mapped roadway data.

4. The apparatus of claim 1, wherein the vertical height of the region of interest is first fixed or specified based on the horizontal width before the visually homogeneous portions of the region of interest are filtered out to reduce the vertical height of the region of interest.

5. The apparatus of claim 1, wherein the horizon identifier is configured to identify the horizon using a gradient-and-color-based approach.

6. The apparatus of claim 1, wherein:
the at least one camera is configured to capture additional sets of image data as the vehicle continues to travel the path of travel; and
the horizon identifier is further configured to perform at least one action chosen from:
identifying the horizon in each of the additional sets of image data; and
tracking the horizon identified in previously-captured image data.

7. The apparatus of claim 1, further comprising an object detector configured to compare the field in the image data to a database of object image data representing objects encounterable during travel of the vehicle to determine if at least of the encounterable objects is present in the field.

8. A vehicle comprising:
a drive system; and
a vehicle control system configured to perform at least one function chosen from:
autonomously controlling the vehicle without assistance of an operator; and
assisting the operator in controlling the vehicle, wherein the vehicle control system includes:
at least one camera configured to capture image data of an area including a path of travel for the vehicle; and
a computing system including:
a path identifier configured to identify the path of travel;
a region of interest selector configured to select a region of interest within the image data, wherein the region of interest has a horizontal width that is specified by the path of travel and has a vertical height that is specified by filtering out visually homogeneous portions of the region of interest;
a horizon identifier configured to identify a horizon in the region of interest; and
a field determiner configured to project the horizon onto the region of interest to isolate a field within the region of interest specified by the path of travel and the horizon, the field being evaluatable for presence of objects.

9. The vehicle of claim 8, wherein the field determiner includes a neural network executable on the computing system.

10. The vehicle of claim 8, wherein the path identifier is configured to identify the path of travel by using at least one path indicator chosen from:
at least one lane marking on a roadway detected in the image data of the area including the path of travel by one of the at least one camera and additional image data captured by at least one additional camera disposed on the vehicle; and
a route included in pre-mapped roadway data.

11. The vehicle of claim 8, wherein the vertical height of the region of interest is first fixed or specified based on the horizontal width before the visually homogeneous portions of the region of interest are filtered out to reduce the vertical height of the region of interest.

12. The vehicle of claim 8, wherein the horizon identifier is configured to identify the horizon using a gradient-and-color-based approach.

13. The vehicle of claim 8, wherein:
the at least one camera is configured to capture additional sets of image data as the vehicle continues to travel the path of travel; and
the horizon identifier is further configured to perform at least one action chosen from:
identifying the horizon in each of the additional sets of image data; and
tracking the horizon identified in previously-captured image data.

14. The vehicle of claim 8, further comprising an object detector configured to compare the field in the image data to a database of object image data representing objects encounterable during travel of the vehicle to determine if at least of the encounterable objects is present in the field.

15. A computer-implemented method comprising:
identifying a path of travel for a vehicle;
capturing image data of an area including the path of travel using at least one camera disposed on the vehicle;
selecting a region of interest within the image data, wherein the region of interest has a horizontal width that is specified by the path of travel and has a vertical height that is specified by filtering out visually homogeneous portions of the region of interest;
identifying a horizon in the region of interest; and
projecting the horizon onto the region of interest to isolate a field specified by the path of travel and the horizon, the field being evaluatable for presence of objects in the path.

16. The computer-implemented method of claim 15, wherein the path of travel is identified by using at least one path indicator chosen from:
at least one lane marking on a roadway detected in the image data of the area including the path of travel by one of the at least one camera and additional image data captured by at least one additional camera disposed on the vehicle, and
a route included in pre-mapped roadway data.

17. The computer-implemented method of claim 15, wherein the vertical height of the region of interest is first fixed or specified based on the horizontal width before the visually homogeneous portions of the region of interest are filtered out to reduce the vertical height of the region of interest.

18. The computer-implemented method of claim 15, wherein identifying the horizon is performed using a gradient-and-color-based approach.

19. The computer-implemented method of claim 15, further comprising:
capturing additional sets of image data with the at least one camera as the vehicle continues to travel the path of travel; and
monitoring the horizon by performing at least one action chosen from:
identifying the horizon in each of the additional sets of image data; and
tracking the horizon identified in previously-captured image data.

20. The computer-implemented method of claim 15, further comprising comparing the field in the image data to a database of object image data that represents objects encounterable during travel of the vehicle to determine if at least of the encounterable objects is present in the field.

* * * * *